United States Patent
Wolter-Doll

(12) United States Patent (10) Patent No.: US 6,205,371 B1
Wolter-Doll (45) Date of Patent: Mar. 20, 2001

(54) METHOD AND APPARATUS FOR DETECTING MACHINING FLAWS, ESPECIALLY CAUSED BY GRINDING MACHINES

(76) Inventor: Dieter Wolter-Doll, Am Ossenbrink 48, 5804 Herdecke (DE)

(*) Notice: Subject to any disclaimer, the term of this patent is extended or adjusted under 35 U.S.C. 154(b) by 0 days.

(21) Appl. No.: 08/307,088

(22) Filed: Sep. 16, 1994

Related U.S. Application Data

(63) Continuation of application No. 07/744,460, filed on Aug. 12, 1991, now abandoned, which is a continuation of application No. 08/138,875, filed on Oct. 18, 1993, now abandoned.

(30) Foreign Application Priority Data

Aug. 11, 1990 (DE) .................................................. 40 25 522

(51) Int. Cl.[7] .................................................. G06F 19/00
(52) U.S. Cl. .......................... 700/174; 700/164; 700/193; 702/35; 318/567; 73/593
(58) Field of Search .......................... 364/474.6, 474.17, 364/474.18, 474.19, 474.21; 51/165.78, 165.92; 318/568, 569, 572, 567; 700/164, 174, 175, 176, 177, 179, 193; 451/5; 340/683; 702/35; 73/162, 602, 660, 593

(56) References Cited

U.S. PATENT DOCUMENTS

| | | | |
|---|---|---|---|
| 4,564,910 | * 1/1986 | Smith et al. | 364/551.02 X |
| 4,590,573 | * 5/1986 | Hahn | 364/474.18 X |
| 4,631,870 | * 12/1986 | Sun | 364/474.06 X |
| 4,748,554 | * 5/1988 | Gebauer et al. | 364/474.15 X |
| 4,772,161 | * 9/1988 | Nagao et al. | 51/165 X |
| 4,855,925 | * 8/1989 | Bhateja | 364/474.06 |
| 4,931,949 | * 6/1990 | Hernandez et al. | 364/474.17 X |
| 5,070,655 | * 12/1991 | Aggarwal | 364/474.06 X |
| 5,136,522 | * 8/1992 | Loehrke | 364/474.06 |

* cited by examiner

Primary Examiner—William Grant
Assistant Examiner—Sheela S. Rao
(74) Attorney, Agent, or Firm—Brown Wood, LLP

(57) ABSTRACT

A method and an apparatus for detecting machining flaws of machine tools mechanically removing material from surfaces, especially of grinding machines, with the help of which the occurrence of machining flaws can be determined directly during the machining of the workpiece itself. This is achieved as far as the method is concerned in that the force exerted by the tool bit upon the workpiece during the machining process is measured as an "actual or momentary" value. This value is then fed to an electronic data processing unit and is compared there with a "nominal" value stored there and obtained from the processing of an unflawed workpiece, the thus obtained values can be documented and used to identify a flawed product.

8 Claims, 6 Drawing Sheets

METHOD AND APPARATUS FOR DETECTING MACHINING FLAWS, ESPECIALLY CAUSED BY GRINDING MACHINES

This is a continuation application of Ser. No. 07/744,460, filed Aug. 12, 1991 now abandoned.

This is a continuation of application Ser. No. 08/138,875, filed Oct. 18, 1993 now abandoned.

The invention deals with a method and an apparatus for detecting machining flaws caused by machine tools mechanically removing material from surfaces, especially by grinding machines.

BACKGROUND OF THE INVENTION

A number of mechanical machining processes exist, where flaws can occur on the surfaces of workpieces and which cannot be detected at all or only with great effort, in spite of the fact that such flaws can result in final destruction or failure if the flawed workpieces are used for long periods. Typical examples are, for instance, heat checks and grinding checks in workpieces finish-machined by grinders, such as shafts, gear wheels or the like. Flaws which do arise can have different reasons or origins. They can be caused by workpiece tolerances, by positioning errors, by differing workpiece hardness and naturally by the condition of the tool bit, for instance by the condition of the grinding disc.

Such work processes are automated precisely in mass production, which entails that basically each machined workpiece must be subsequently inspected, in order to avoid later failure of the workpieces due to these machining defects, or in order from the start to eliminate such defective workpieces. Such an inspection is naturally very expensive.

SUMMARY OF THE INVENTION

Thus an object of this invention is a solution by means of which the occurrence of such machining flaws can be detected directly during the machining process of the workpiece itself, in such a way that either the workpiece is identified as being flawed or however counter or corrective measures are made possible. Possible measures include, for instance, increasing or decreasing the feed or drive velocity of a grinding tool.

This object is achieved in accordance with one aspect of the invention in the process of the previously described type in such a way that the force applied by the tool bit upon the workpiece is measured in the course of the machining process as an "actual or instantaneous" value, this value being fed to an electronic data processing arrangement and is there compared with a "nominal" value stored there and that the obtained values are documented.

It would seem that the flaw sources indicated above directly lead to an increased force applied by the tool bit to the workpiece. If, for instance, the workpiece is too large in the machining region due to workpiece tolerances, a larger amount must be removed by grinding, which is immediately reflected in a higher grinding force with a grinding disc with automatic feed. If the workpiece is incorrectly positioned in the workpiece receptacle, a similar error can occur. If the wrong workpiece hardness is present in the machining region, this again results in an increased force with a grinding disc having automatic feed. If for instance the grinding disc is glazed or clogged, possibly the force exerted on the workpiece must be increased for removal of a predetermined amount of surface material. The determination of all these possible sources of error and with this the increase of the force exerted by the tool bit upon the workpiece can be performed without any problems by means of the invention.

In accordance with a further feature of the invention, the grinding force can be measured directly at the tool bit spindle or indirectly by the deformation of the tool bit receptacle, wherein it can be especially provided that the grinding force is measured in a contactless manner by high resolution inductive path pick-ups at the tool bit receptacle. The invention also provides for the utilization of accelerometers independent of reference points at the tool bit receptacle instead of inductive path pick-ups, or for the use of reference point free accelerometers in combination with path pick-ups. It was observed that in certain machining processes using accelerometers, the dynamic excursion, be it of the workpiece, the tool bit or the workpiece receptacles, can be measured. Reference curves can be prepared with these vibration pick-ups, with which then the momentary or actual curve can be compared.

A simple procedure in accordance with a preferred embodiment of the invention consists in machining first of all a workpiece in accordance with the machining program and to determine and store all actual or momentary values during the entire time period. If the workpiece is determined to be free of flaws after individual very detailed inspection, the thus determined actual values are stored in the computer as the nominal values and are electronically processed during subsequent machining of identical workpieces.

It is known in profile grinding machines to simultaneously grind for instance two tooth flanks. In order to avoid detecting an error on the one side in a more than proportional manner and to thus utilize same, the invention provides to use at least two inductive path pick-ups located at an angle with respect to each other for measuring the grinding force, wherein the measured signals are digitized, stored and filtered in two channels. With this it is possible to avoid flaws in the data acquisition cycle. If for instance only one tooth flank is excessively machined due to warping of the workpiece, it is possible to fail to detect this in case of a one-dimensional measurement. Here it is expedient to compare the individual and the overall values with their respective limit values in a "two-dimensional" manner.

It should be noted that the same type of measurement can naturally also be performed three-dimensionally in the invention. Then, appropriately three measured value pick-ups are provided.

The invention also provides to centrally control the grinding processes, especially the feed and drive velocity of the tool bit by means of the measured value acquisition, wherein it can be provided in another refinement that all measured signals are printed out by a printer in the form of curves or measured value columns.

It is known for instance from the DE-81 21 451-A to measure vibrations of machine tools in order to prevent these from being damaged. A tool bit failure monitoring is for instance also known from the DE-37 11 434-A. However, with these references, no flaws at workpieces to be machines are established or recorded, rather merely unusual events at the tool bits or the machine tools.

The invention also provides a device for solving the task stated above which is distinguished by at least one measured value pick-up recording the force between the tool bit and the workpiece, in cooperation with an assigned electronic data processing installation. The design uses the knowledge that, for instance, heat checks occur with an excessive grinding force, wherein then an elastic deformation of, for instance, the tool bit receptacle or the tool bit spindle occurs with reference to the machine foundation. According to the invention, figures in the range of 5 to 15 micrometers being a function of the grinding force can be determined in a measuring axes region.

The invention however also provides two measured value pick-ups operating in a contactless manner at the tool bit receptacle and/or at the tool bit driving spindle, whose effective measuring axes are at an angle to each other, so that it can be in particular provided that high resolution inductive path pick-ups operating in a contactless manner and/or accelerometers operating without reference points are provided as measured value pick-ups.

It is advantageous if an electronic amplifier, a filter and an A/D-converter is assigned to each path pick-up for the purpose of transmitting the measured value to a central processing unit, as this is also provided in the invention. The device is finally also distinguished in that it is equipped with at least one storage means for storing of a nominal value, a predetermined normal grinding curve and an actual or momentary value.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
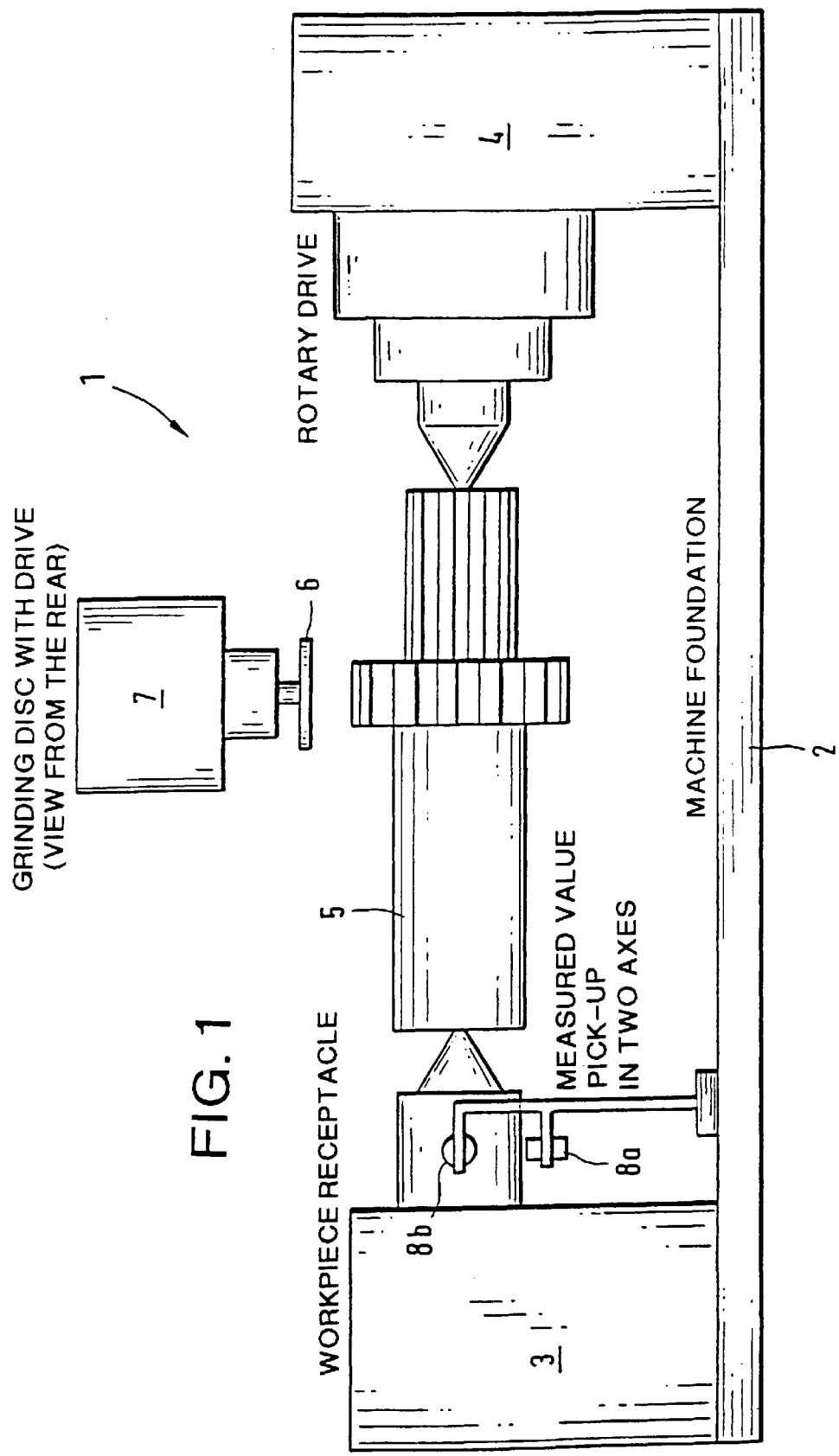
FIG. 1 is a diagrammatic illustration of a grinding machine with the installation in accordance with a preferred embodiment of the invention.

The apparatus overall designated with 1 comprises in the depicted example on a common machine foundation 2 a workpiece receptacle 3 and a rotary drive 4, in between whose tips the workpiece 5, for instance a gear box gear wheel, is clamped. A grinding disc 6 with drive 7 for the machining process is outlined in FIG. 1.

Figure 2:
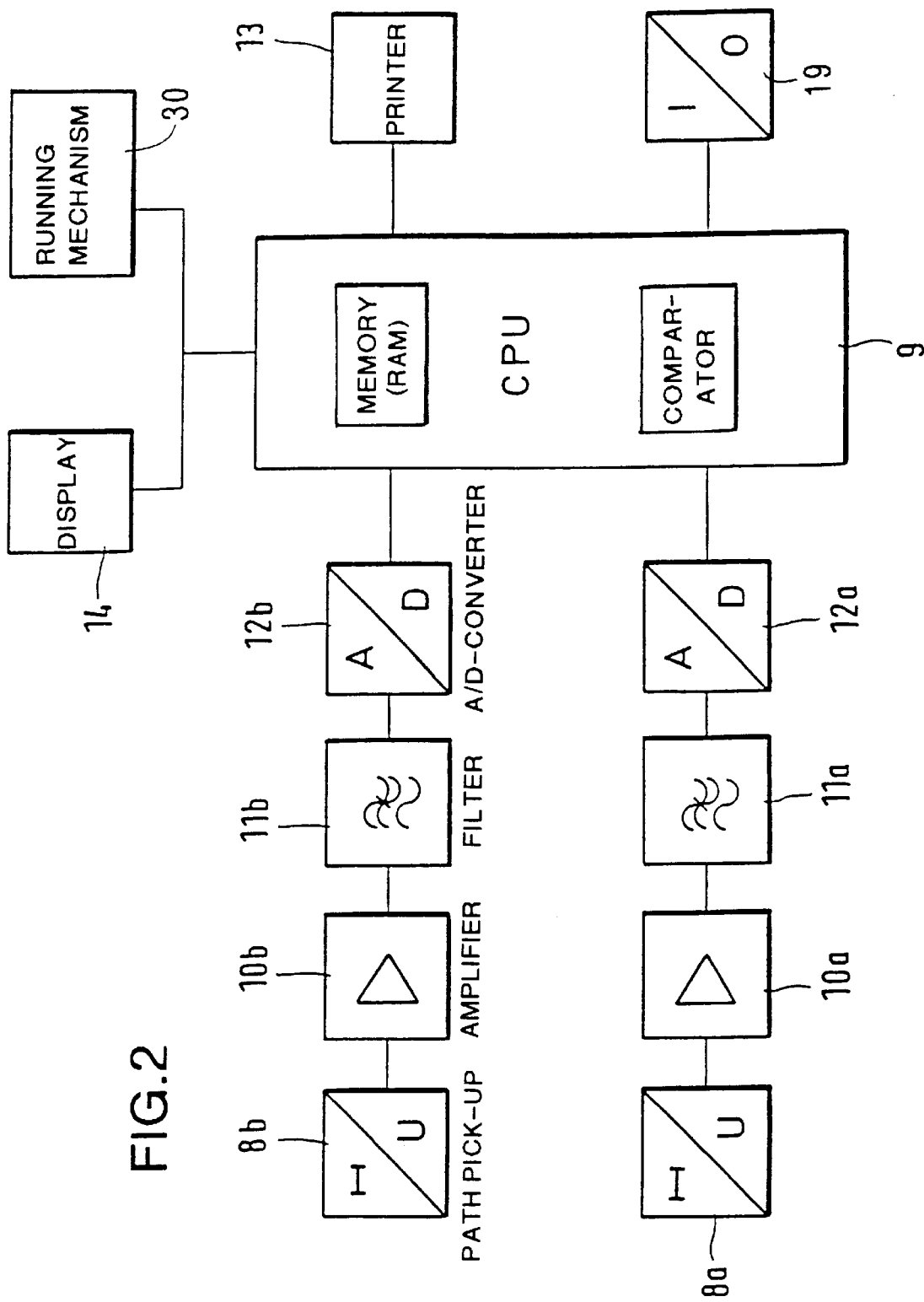
FIG. 2 is a simplified electronic circuit diagram of the data tranmittal taken with the machine of FIG. 1.

Two measured value pick-ups 8a and 8b as path pick-ups working in a contactless manner whose axes are perpendicular to each other are provided between the machine foundation 2 and the workpiece receptacle 3. Examples are known sensors with which the pick-up 8a detects a displacement in a vertical direction, and the pick-up 8b detects a displacement in a horizontal direction. The outputs from the pick-ups 8a, 8b are electrical signals that are processed as shown in FIG. 2. The elements 8a and 8b in FIG. 1 are not force measuring sensors, but path transducers. They measure the grinding force indirectly by picking up the displacement of the workpiece receptacle 5 relative to the machine foundation 2. Such transducers are normally obtained by known inductive displacement transducers.

The invention also contemplates the use of force transducers which, in this case, will be assembled as contacting transducers in the workpiece receptacle 5 or in the bearing of the grinding disc drive 7 shaft. In this case, the preferred transducers will be strain gauges or as piezo electric force transducers.

The advantage of the non-contacting measurement is that the mechanical construction and the stability of the machine is not influenced. Thus, the assembly is much easier and retrofitting is possible.

FIG. 2 illustrates the data flow of the data determined by the path pick-ups 8a and 8b to a central processing unit 9. An amplifier 10a or 10b, a filter 11a or 11b and an A/D-converter 12a or 12b is assigned to each measured value pick-up 8a and 8b in a separate channel. The CPU, meaning the central processing unit 9, can additionally be equipped for instance with a printout unit 13 and/or an indicator unit, for instance, a display 14. The CPU comes equipped with its own memory or store as well as its own comparator. The comparator can often be a program which compares instant values with preset reference values or limits, examples of which are given below. The store is typically designed as a very large ram memory used for reference and instant values. The data from the ram memory can be copied to a running mechanism 30.

Figure 6:
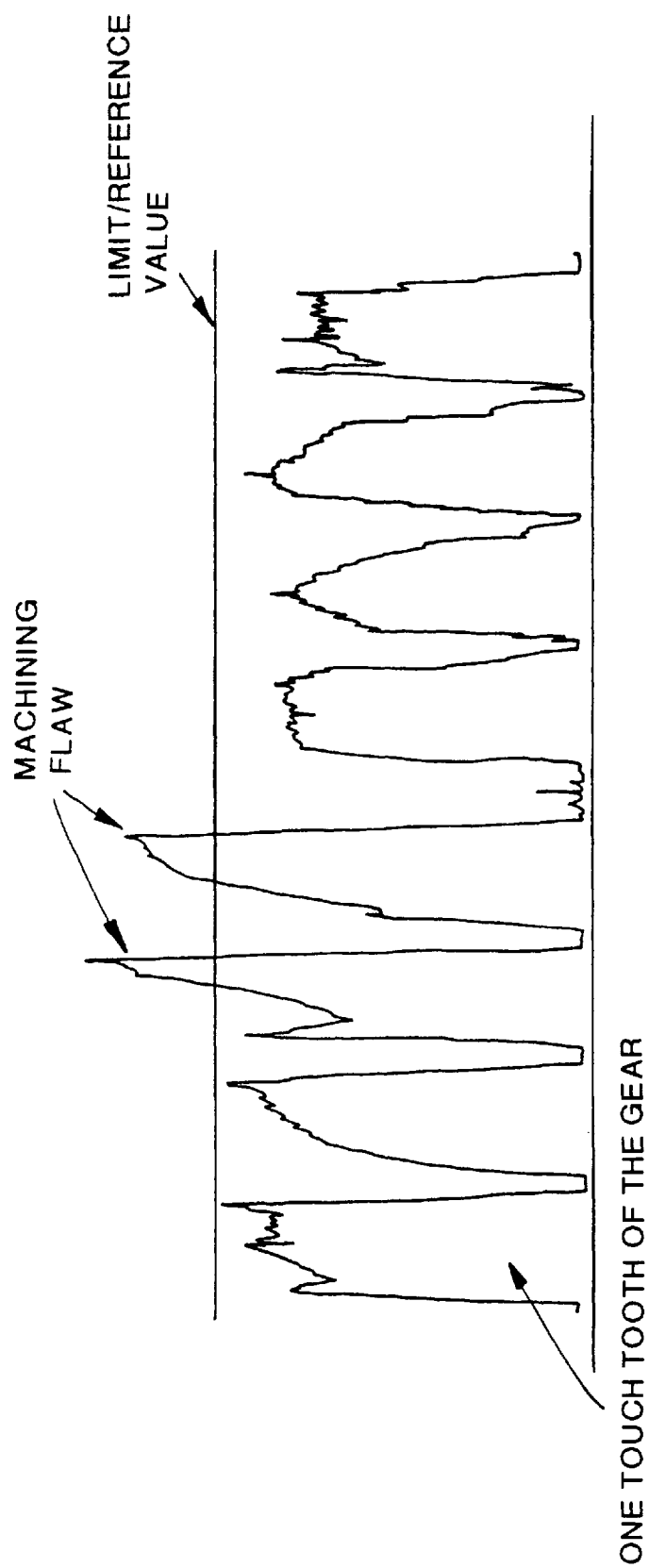
FIG. 6 shows a typical printout of a machining operation with the machine of the invention.

The function of the running mechanism 30 is the loading of data and software to and from the CPU. Because of the large size of the grinding data files (normally >500 kbytes), it is much easier and faster to store this data on magnetic systems than as paper hard copy. The further processing with external systems of the grinding data is made possible by this storing mode, too. As shown in FIG. 2, the CPU can drive a standard printer 13. FIG. 6 illustrates a typical printout or grinding diagram on grinding of a gear which illustrates with labels the reference level displacement and excess displacements indicating flaws.

An input/output unit 19 is also connected to the CPU. It in turn can be connected to the grinding disc drive 7. Thus, the system is able to control the feed velocity of the grinding tool by means of a digital control-value which is sent to the grinding machine's controller in a known manner. For instance, if the force exceeds a critical level, it will drive the feed of the disc down until it reaches an uncritical value. Because of the high data evaluation speed, the system is able to drive the feed down before a workpiece flaw occurs. The data-transfer is usually done via an RS232 Port. In operation, the CPU is programmed in a known manner to react to pick-up signals exceeding a certain threshold displacement of say, 5–15 micrometers, to reduce the drive on the grinding grinding wheel 6. Alternatively, when small tool bit forces are detected, the drive can be increased. The circuitry and programming to accomplish this is well within the skill of the artisan.

As described in the description above, a particular workpiece can be carefully processed while recording the actual curve with the equipment of the invention. It is then carefully checked. If perfect, its measured recording is used as the nominal or standard value against which to compare the output from the machining of similar workpieces. The CPU is easily programmed to detect a large deviation from the nominal annd measured values, suggesting that a machining parameter changed indicating the likelihood or at least the possibility of a defect or flaw in the just-machined workpiece.

Figure 3:
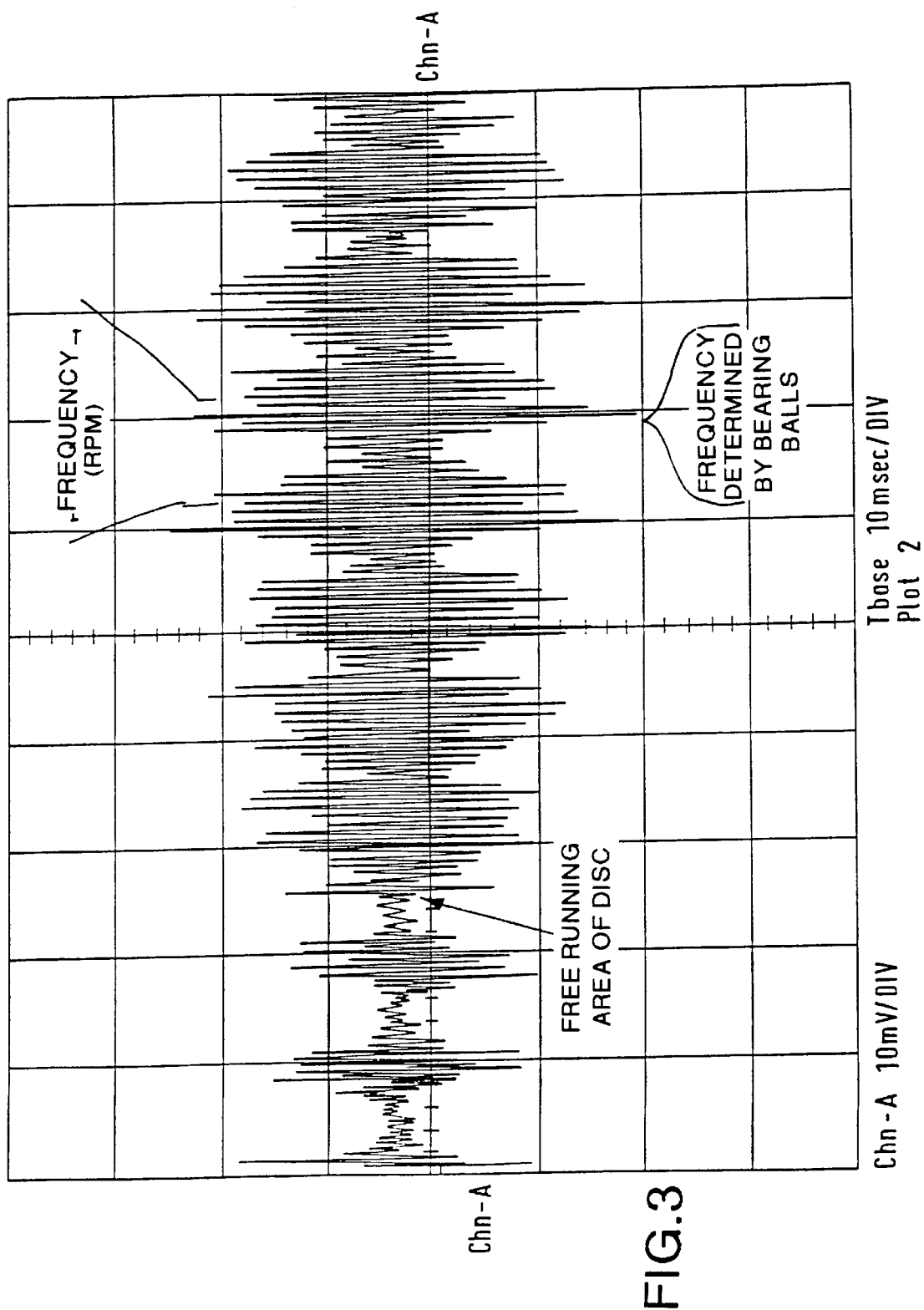
FIG. 3 is the trace of a vibration curve determined by accelerometers according to the invention.

FIG. 3 shows the trace of a vibration pick-up by accelerometers connected to the system of FIG. 1, which also enable reproducible monitoring of workpieces to be machined. FIG. 3 is a magnified plot of the acceleration transducer signal. The frequency of the vibration packages is determined by the frequency (RPM) of the grinding disc. The vibration frequency is determined by the number of balls in the disc drive shaft bearing. In FIG. 3, the low rate between the vibration packages shows that at this determined working area, the disc is only grinding with one-half turn. The other half-turn of the disc is running free.

Here also the monitoring can occur by means of first registering a reference curve, the respectively momentary actual curve later obtained then being compared with the reference curve and is then evaluated by an evaluation device for instance according to FIG. 2. In this case, the significant factor would be the amplitude of the vibrations, and the values of the actual vibrations would be used to indicate flaws or to control the grinding process as described.

Figure 4:
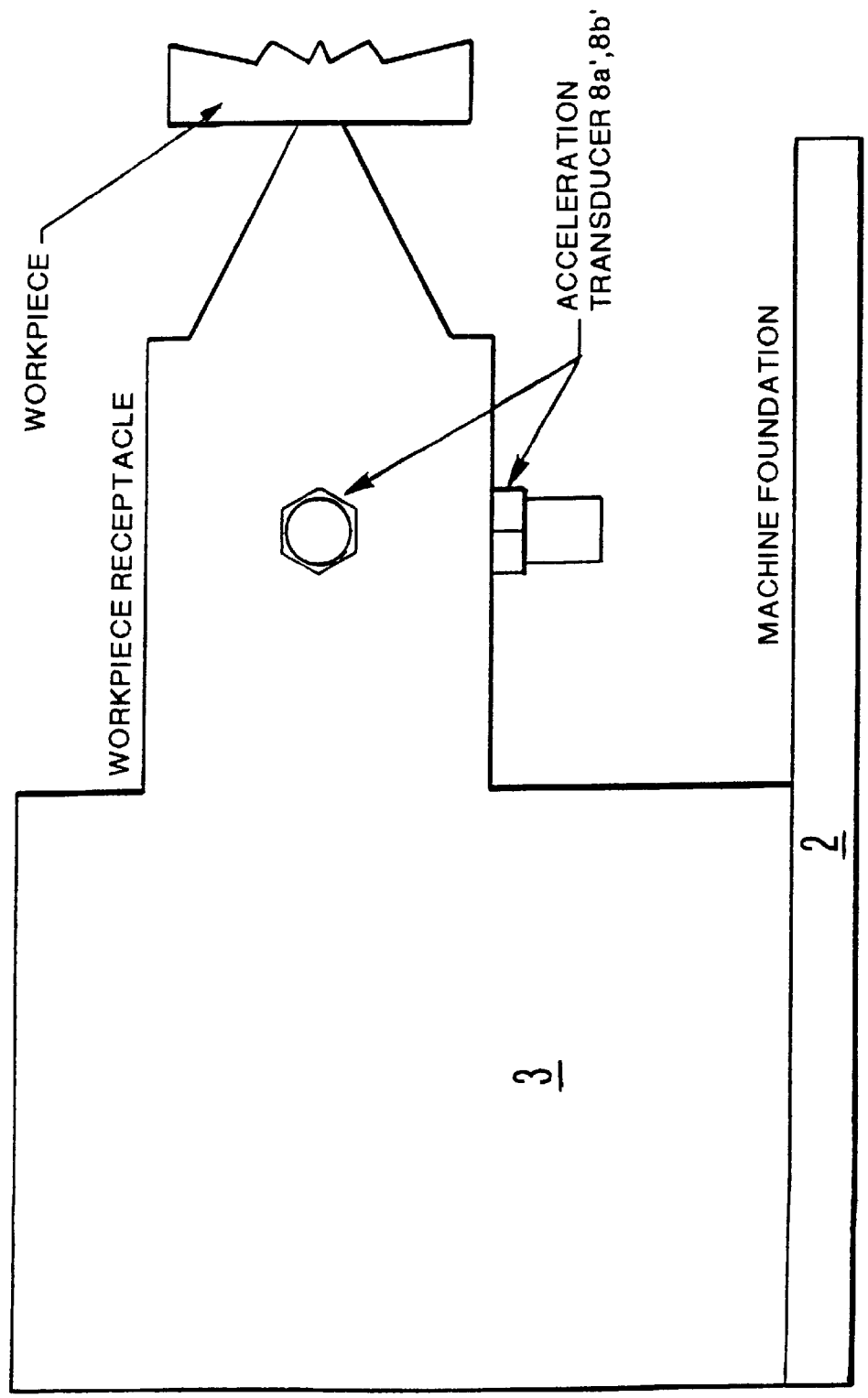
FIG. 4 is a view of part of the machine of FIG. 1 showing a modification.

Accelerometers can also be substituted as alternate sensors. The accelerometers are mounted in the same way as the non-contacting displacement transducers. The only difference is that they are assembled with screws on the workpiece receptacle. FIG. 4 shows accelerometers 8a', 8b' mounted as described on the workpiece receptacle 3.

Figure 5:
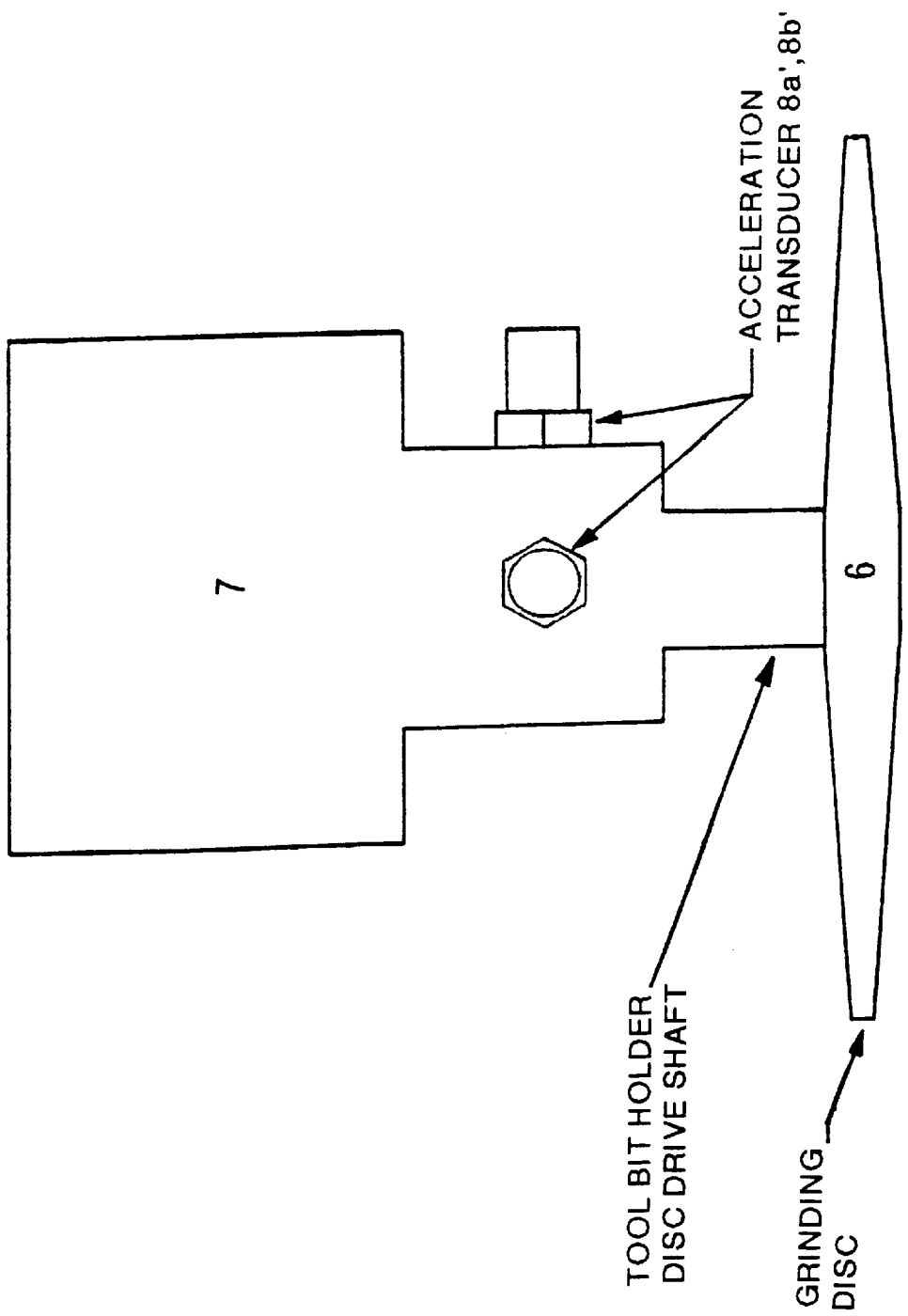
FIG. 5 is a view of part of the machine of FIG. 1 showing a further modification.

The force can be measured as described in connection with FIGS. 1 and 4 on the workpiece receptacle 3 or on the tool spindle which is, in this special application, normally the tool bit holder also. In this latter case, the force can be measured directly with force transducers or indirectly with non-contacting proximity transducers or accelerometers. The assembly is shown in FIG. 5 with acceleration transducers 8a', 8b'.

Naturally, the embodiment of the invention which has been described can be changed in many ways without departing from the spirit of the invention. Thus, for instance, the central processing unit can be switched directly to the feed as well as to the rotary drive on the one hand and also to the grinding disc on the other hand, as has already been mentioned above, and more than two measured value pick-ups can be provided and more of the same. For accelerometers, the filters 11a, 11b are typically designed as band-pass, and for force and proximity transducers, they are designed typically as low-pass.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method of preventing machining flaws in a tooth wheel, which are caused by a grinding disc which simultaneously grinds two adjacent tooth flanks of adjacent teeth of the tooth wheel, when the grinding disc is applied against the two adjacent tooth flanks with excessive force during grinding, said method comprising the steps of:
   determining nominal grinding forces applied by the grinding disc to a test tooth wheel produced without any machining flaws and storing nominal force values;
   continuously measuring a grinding force which is applied by the grinding disc to the tooth wheel in two axes extending at an angle to each other during regular grinding of the tooth wheel;
   comparing instantaneous measurement value of the grinding force with a corresponding nominal grinding force value; and
   changing at least one of feed and rotational speed of the grinding disc in accordance with a comparison value, whereby the grinding force, applied by the grinding disc, is brought in accordance with the corresponding nominal force value;
   wherein said grinding force measuring step comprises measuring displacement of tooth wheel supporting means, which is caused by application of the grinding force to the tooth wheel, with two high-resolution inductive path pick-ups arranged at an angle with respect to each other corresponding to the angle at which the two axes extend to each other.

2. A method as set forth in claim 1, wherein control of the grinding disc is actuated when the displacement exceeds a threshold value selected within a range of 5–15 microns.

3. A method of preventing machining flaws in a tooth wheel, which are caused by a grinding disc which simultaneously grinds two adjacent tooth flanks of adjacent teeth of the tooth wheel, when the grinding disc is applied against the two adjacent tooth flanks with excessive force during grinding, said method comprising the steps of:
   determining nominal grinding forces applied by the grinding disc to a test tooth wheel produced without any machining flaws and storing nominal force values;
   continuously measuring a grinding force which is applied by the grinding disc to the tooth wheel in two axes extending at an angle to each other during regular grinding of the tooth wheel;
   comparing instantaneous measurement value of the grinding force with a corresponding nominal grinding force value; and
   changing at least one of feed and rotational speed of the grinding disc in accordance with a comparison value, whereby the grinding force, applied by the grinding disc, is brought in accordance with the corresponding nominal force value;
   wherein said grinding force measuring step comprises measuring a vibration frequency of the grinding disc with two accelerometer pick-ups.

4. A method of preventing machining flaws in a tooth wheel, which are caused by a grinding disc which simultaneously grinds two adjacent tooth flanks of adjacent teeth of the tooth wheel, when the grinding disc is applied against the two adjacent tooth flanks with excessive force during grinding, said method comprising the steps of:
   determining nominal grinding forces applied by the grinding disc to a test tooth wheel produced without any machining flaws and storing nominal force values;
   continuously measuring a grinding force which is applied by the grinding disc to the tooth wheel in two axes extending at an angle to each other during regular grinding of the tooth wheel;
   comparing instantaneous measurement value of the grinding force with a corresponding nominal grinding force value; and
   changing at least one of feed and rotational speed of the grinding disc in accordance with a comparison value, whereby the grinding force, applied by the grinding disc, is brought in accordance with the corresponding nominal force value;
   wherein said grinding force measuring step comprises measuring displacement of tooth wheel supporting means, which is caused by application of the grinding force to the tooth wheel, with two accelerometers pick-ups arranged at an angle with respect to each other corresponding to the angle at which the axes extent to each other.

5. A method of preventing machining flaws in a tooth wheel, which are caused by a grinding disc which simultaneously grinds two adjacent tooth flanks of adjacent teeth of the tooth wheel, when the grinding disc is applied against the two adjacent tooth flanks with excessive force during grinding, said method comprising the steps of:

determining nominal grinding forces applied by the grinding disc to a test tooth wheel produced without any machining flaws and storing nominal force values;

continuously measuring a grinding force which is applied by the grinding disc to the tooth wheel in two axes extending at an angle to each other during regular grinding of the tooth wheel;

comparing instantaneous measurement value of the grinding force with a corresponding nominal grinding force value; and changing at least one of feed and rotational speed of the grinding disc in accordance with a comparison value, whereby the grinding force, applied by the grinding disc, is brought in accordance with the corresponding nominal force value;

printing out measurement values in a form of one of curves and a measured value column.

6. An apparatus for preventing machining flaws in a tooth wheel which are caused by a grinding disc, which simultaneously grinds two adjacent tooth flanks of adjacent teeth of the tooth wheel, when the grinding disc is applied against the two adjacent tooth flanks with excessive force during grinding, said apparatus comprising:

means for storing values of nominal grinding forces applied by the grinding disc to a test tooth wheel produced without any machining flaws;

means for continuously measuring a grinding force, which is applied by the grinding disc to the tooth wheel, in two axes extending at an angle to each other during regular grinding of tooth wheels, said continuously measuring means comprising two pick-ups arranged at an angle to each other corresponding to the angle at which the two axes extend to each other;

means for comparing an instantaneous measurement value of the grinding force with a corresponding nominal grinding force value; and means for changing at least one of feed and rotational speed of the grinding disc in accordance with a comparison value, to thereby bring the grinding force, applied by the grinding disc to the tooth wheel in accordance with the corresponding force value, wherein said two pick-ups are formed as two high-resolution inductive path pick-ups.

7. An apparatus for preventing machining flaws in a tooth wheel which are caused by a grinding disc, which simultaneously grinds two adjacent tooth flanks of adjacent teeth of the tooth wheel, when the grinding disc is applied against the two adjacent tooth flanks with excessive force during grinding, said apparatus comprising:

means for storing values of nominal grinding forces applied by the grinding disc to a test tooth wheel produced without any machining flaws;

means for continuously measuring a grinding force, which is applied by the grinding disc to the tooth wheel, in two axes extending at an angle to each other during regular grinding of tooth wheels, said continuously measuring means comprising two pick-ups arranged at an angle to each other corresponding to the angle at which the two axes extend to each other;

means for comparing an instantaneous measurement value of the grinding force with a corresponding nominal grinding force value; and means for changing at least one of feed and rotational speed of the grinding disc in accordance with a comparison value, to thereby bring the grinding force, applied by the grinding disc to the tooth wheel in accordance with the corresponding force value, wherein said grinding force measuring means comprises accelerometer pick-up means for measuring a vibration frequency of the grinding disc.

8. An apparatus for preventing machining flaws in a tooth wheel which are caused by a grinding disc, which simultaneously grinds two adjacent tooth flanks of adjacent teeth of the tooth wheel, when the grinding disc is applied against the two adjacent tooth flanks with excessive force during grinding, said apparatus comprising:

means for storing values of nominal grinding forces applied by the grinding disc to a test tooth wheel produced without any machining flaws;

means for continuously measuring a grinding force, which is applied by the grinding disc to the tooth wheel, in two axes extending at an angle to each other during regular grinding of tooth wheels, said continuously measuring means comprising two pick-ups arranged at an angle to each other corresponding to the angle at which the two axes extend to each other;

means for comparing an instantaneous measurement value of the grinding force with a corresponding nominal grinding force value; and means for changing at least one of feed and rotational speed of the grinding disc in accordance with a comparison value, to thereby bring the grinding force, applied by the grinding disc to the tooth wheel in accordance with the corresponding force value, wherein said two pick-ups comprises two accelerometer pick-ups for measuring displacement of tooth wheel supporting means, which is caused by application of the grinding force to the tooth wheel.

* * * * *